United States Patent
Stanzel et al.

(10) Patent No.: US 11,448,098 B2
(45) Date of Patent: *Sep. 20, 2022

(54) ARRANGEMENT FOR CONVERTING THERMAL ENERGY FROM LOST HEAT OF AN INTERNAL COMBUSTION ENGINE

(71) Applicant: Daimler AG, Stuttgart (DE)

(72) Inventors: Nicolas Stanzel, Stuttgart (DE); Martin Luippold, Reutlingen (DE)

(73) Assignee: Daimler AG, Stuttgart (DE)

(*) Notice: Subject to any disclaimer, the term of this patent is extended or adjusted under 35 U.S.C. 154(b) by 249 days.

This patent is subject to a terminal disclaimer.

(21) Appl. No.: 16/955,203

(22) PCT Filed: Dec. 17, 2018

(86) PCT No.: PCT/EP2018/085256
§ 371 (c)(1),
(2) Date: Jun. 18, 2020

(87) PCT Pub. No.: WO2019/121540
PCT Pub. Date: Jun. 27, 2019

(65) Prior Publication Data
US 2020/0340371 A1    Oct. 29, 2020

(30) Foreign Application Priority Data

Dec. 21, 2017   (DE) ............... 10 2017 011 844.2

(51) Int. Cl.
*F01K 23/06*   (2006.01)
*F02M 26/28*   (2016.01)
(Continued)

(52) U.S. Cl.
CPC .......... *F01K 23/065* (2013.01); *F01N 3/043* (2013.01); *F01N 5/02* (2013.01); *F01P 3/02* (2013.01);
(Continued)

(58) Field of Classification Search
CPC . F01K 23/065; F01P 3/20–22; F02G 5/00–04
See application file for complete search history.

(56) References Cited

U.S. PATENT DOCUMENTS

2004/0250546 A1* 12/2004 Ichikawa ............. F01C 11/008
60/670
2013/0068202 A1* 3/2013 Kardos .................. F01P 7/165
123/563

(Continued)

FOREIGN PATENT DOCUMENTS

CN        101852130 A    10/2010
DE  10 2015 016 783 A1   8/2016
(Continued)

OTHER PUBLICATIONS

PCT/EP2018/085256, International Search Report dated Mar. 22, 2019 (Three (3) Pages).

(Continued)

*Primary Examiner* — Laert Dounis
(74) *Attorney, Agent, or Firm* — Crowell & Moring LLP

(57) ABSTRACT

An arrangement for converting thermal energy from lost heat of an internal combustion engine into mechanical energy where a working circuit is provided for a working medium which can be heated and evaporated using the lost heat. An expansion machine for obtaining mechanical energy from the heat of the working medium is provided in the working circuit where the working circuit extends through a heat exchanger mounted upstream of the expansion engine in the flow direction of the working medium. The internal combustion engine includes a cylinder having a cylinder liner. A cooling duct is provided in the cylinder liner through which the working medium flows. The cylinder liner is formed by centrifugal casting where the cooling duct is introduced into one centrifugal mold as an insert prior to the centrifugal casting.

9 Claims, 3 Drawing Sheets

(51) Int. Cl.
*F01N 3/04* (2006.01)
*F01N 5/02* (2006.01)
*F01P 3/02* (2006.01)
*F01P 3/22* (2006.01)
*F02F 1/16* (2006.01)
*F02G 5/04* (2006.01)
*F02F 1/00* (2006.01)
*F02F 1/10* (2006.01)
*B22D 13/02* (2006.01)
*F16J 10/00* (2006.01)

(52) U.S. Cl.
CPC ............... *F01P 3/22* (2013.01); *F02F 1/004* (2013.01); *F02F 1/10* (2013.01); *F02F 1/16* (2013.01); *F02G 5/04* (2013.01); *F02M 26/28* (2016.02); *B22D 13/026* (2013.01); *F01P 2003/021* (2013.01); *F02F 2200/06* (2013.01); *F02G 2260/00* (2013.01); *F16J 10/00* (2013.01)

(56) References Cited

U.S. PATENT DOCUMENTS

| | | | | |
|---|---|---|---|---|
| 2013/0199178 A1* | 8/2013 | Kanou | ............ | F02G 5/02 60/605.2 |
| 2014/0137554 A1* | 5/2014 | Ernst | ............ | F02G 5/04 60/618 |
| 2018/0372023 A1* | 12/2018 | Wu | ............ | F02G 5/02 |
| 2019/0368383 A1* | 12/2019 | Arnold | ............ | F01P 3/22 |
| 2020/0191020 A1* | 6/2020 | Delahanty | ............ | F01P 5/10 |
| 2020/0340371 A1* | 10/2020 | Stanzel | ............ | F01P 3/02 |

FOREIGN PATENT DOCUMENTS

| | | | | |
|---|---|---|---|---|
| DE | 102015016783 A1 | * | 8/2016 | |
| DE | 102017003562 A1 | * | 10/2018 | |
| EP | 1 455 074 A1 | | 9/2004 | |
| GB | 900294 | | 7/1962 | |
| WO | WO 2010/000284 A2 | | 1/2010 | |
| WO | WO-2010000284 A2 | * | 1/2010 | ........... F01K 23/065 |

OTHER PUBLICATIONS

U.S. Patent Application, "Arrangement For Converting Thermal Energy From Lost Heat of an Internal Combustion Engine", filed Jun. 18, 2020, Inventor: Eugen Krebs et al.

* cited by examiner

ARRANGEMENT FOR CONVERTING THERMAL ENERGY FROM LOST HEAT OF AN INTERNAL COMBUSTION ENGINE

BACKGROUND AND SUMMARY OF THE INVENTION

The invention relates to an arrangement for converting thermal energy from lost heat of an internal combustion engine.

From US 2014/0137554 A1 a waste heat recovery system is known which connects a working fluid with fluid passages formed in an engine block and/or a cylinder head of an internal combustion engine with internal combustion to form a heat exchanger. The fluid passages are formed near high temperature regions of the engine to supply sufficient thermal energy to the working fluid to vaporize the working fluid while the working fluid advantageously cools the engine block and/or the cylinder head in order to improve the fuel efficiency. The arrangement of the engine heat exchanger downstream of the exhaust gas recirculation superheater and upstream of an exhaust gas heat exchanger leads to an optimal position of the engine heat exchanger with respect to the thermodynamic circuit of the waste heat recovery system, wherein the cooling of the recirculated exhaust gas is prioritized. The arrangement of valves in the waste heat recovery system offers the possibility to select a plurality of parallel flow paths for optimal operation.

The invention is based on the object of specifying an improved arrangement for converting thermal energy from lost heat of an internal combustion engine.

An arrangement in accordance with the invention for converting thermal energy from lost heat of an internal combustion engine, in particular of a motor vehicle, into mechanical energy comprises a working circuit for a working medium which can be heated and evaporated using the lost heat, wherein an expansion engine for obtaining mechanical energy from the heat of the working medium is provided in the working circuit, wherein the working circuit runs through a heat exchanger upstream of the expansion engine in the flow direction of the working medium, wherein the heat exchanger comprises an exhaust gas recirculation heat exchanger having a colder part and a warmer part, an exhaust gas heat exchanger, and a phase transition cooling system in the internal combustion engine, wherein the internal combustion engine comprises at least one cylinder having a cylinder liner, wherein the heat exchanger is formed by serially interconnecting in order the colder part of the exhaust gas recirculation heat exchanger, exhaust gas heat exchanger, phase transition cooling in the internal combustion engine, warmer part of the exhaust gas recirculation heat exchanger, wherein at least one cooling duct is provided in the cylinder liner, through which the working medium flows, wherein the cylinder liner is formed by means of centrifugal casting, wherein the at least one cooling duct is inserted into the one centrifugal mold as an insert prior to the centrifugal casting.

In one embodiment, at least one heat exchanger, in particular at least a part of the exhaust gas recirculation heat exchanger, is designed as a counter-current heat exchanger. To improve operation safety against overheating, the counterflow heat exchangers or parts of the counterflow heat exchangers can be replaced by co-current heat exchangers, but this is at the expense of system performance.

According to the invention, the exhaust gas heat exchanger is arranged in series in the working circuit upstream of the internal combustion engine and downstream of the colder part of the exhaust gas recirculation heat exchanger. In the internal combustion engine, the cooling is designed as phase change cooling (PCC). This makes it possible to use water or a water-ethanol mixture as the cooling medium and to operate at a high evaporation pressure. The phase change cooling enables a constantly high wall temperature, such that the so-called pinch point problem can be defused. A fuel savings potential of 7% to 8% when used in heavy commercial vehicles appears possible. Compared to a parallel interconnection, the fuel efficiency can be improved by 2%, for example.

In an upper region of the cylinder liner, high evaporation temperatures can be achieved in the cooling ducts without changing the wall heat on the inside of the cylinder liner where combustion takes place. This cooling can eliminate the need for a water jacket on the outside of the cylinder liner, whereby the risk of cylinder liner cavitation is also eliminated or reduced. Therefore, a larger piston clearance can be run, which reduces the friction of the piston group.

Exemplary embodiments of the invention are explained in more detail below using the drawings.

DETAILED DESCRIPTION OF THE DRAWINGS

Parts corresponding to each other are provided with the same referral numerals in all Figures.

Figure 1:
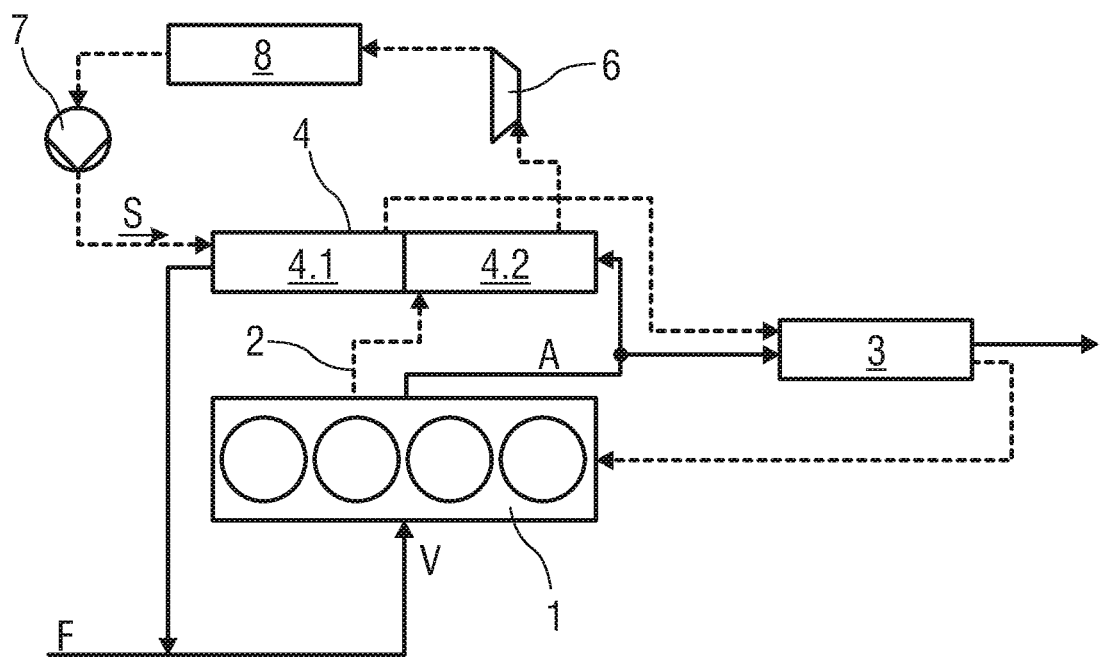
FIG. 1 is a schematic depiction of an internal combustion engine having a working circuit for exhaust gas heat recovery.

FIG. 1 is a schematic depiction of an internal combustion engine 1 having a working circuit 2, which is designed to perform a steam cycle, in particular a Clausius-Rankine cycle or an Organic-Rankine cycle.

The internal combustion engine 1 is supplied with combustion air V, which consists in part of fresh air F. Exhaust gases A of the internal combustion engine 1 are partly discharged into the surroundings via an exhaust gas heat exchanger 3 and an exhaust system (not shown) and partly combined with the fresh air F via an exhaust gas recirculation heat exchanger 4 in order to form the combustion air V.

The exhaust gas recirculation heat exchanger 4 has a colder part 4.1 and a warmer part 4.2, wherein the colder part 4.1 is located downstream of the warmer part 4.2 in the exhaust gas flow.

The working circuit 2 is led out of the colder part 4.1 of the exhaust gas recirculation heat exchanger 4 in series one after the other via the exhaust gas heat exchanger 3, the internal combustion engine 1 into the warmer part 4.2 of the exhaust gas recirculation heat exchanger 4. In the internal combustion engine 1, the cooling can be designed as phase change cooling (PCC). In the working circuit 2, a working medium is provided, for example water and/or ethanol and/or methanol.

In the working circuit 2, the working medium circulates, which can be heated and evaporated by using lost heat, in particular exhaust gas heat and/or lost heat from the internal combustion engine 1. In the working circuit 2, after passing through the warmer part 4.2 of the exhaust gas recirculation heat exchanger 4, the working medium is fed to an expansion engine 6 to obtain mechanical energy from the heat of the working medium. The working medium circulates in the working circuit 2, driven by a pump 7.

The working circuit 2 runs in the flow direction S of the working medium after the expansion engine 6 through a condenser 8 and the pump 7 back into the colder part 4.1 of the exhaust gas recirculation heat exchanger 4. The working medium is heated and at least partially evaporated by exhaust gas heat in the exhaust gas recirculation heat exchanger 4 and in the exhaust gas heat exchanger 3 as well as by engine heat in the internal combustion engine 1. In the expansion engine 6, the working medium expands, wherein thermal energy is converted into mechanical energy, which is subsequently converted into electrical energy by means of a generator (not shown) or used in some other way. Through the expansion, the working medium cools down and is then passed through the condenser 8, where it is cooled and condensed before it reaches pump 7 again.

Pressure and temperature of the evaporative cooling can be controlled as follows.

The temperature is controlled by means of a mass flow of the working medium. If the working medium temperature at the expansion engine inlet is to be lowered, the working medium mass flow must be increased. If the working medium temperature at the expansion engine inlet is to be increased, the working medium mass flow must be lowered. Here, the pump 7 can be designed to be electrically variable, or can also be coupled to the engine speed of the internal combustion engine 1 via a variable transmission. In the case of a rigid connection to the engine speed, the mass flow can be adjusted via a variable stroke or a bypass.

The evaporation pressure can be adjusted over a wide range via the speed of the expansion engine 6 using a volumetric expansion engine 6, which is designed as a scroll expander, screw, piston expander, for example, since the inlet volume flow and speed are almost linearly related to each other. If a turbine, for example, a radial or axial turbine, is used as expansion engine 6, the pressure is given by the effective cross section of the turbine and the throughput. This cross-section can also be designed variably, e.g., by means of a variable turbine geometry or variable partial admission.

For the evaporative cooling of an internal combustion engine 1, the combination of a volumetric expansion engine 6 and a turbine can prove to be particularly advantageous: with the speed of the volumetric expansion engine 6, the evaporation pressure can be adjusted. The downstream turbine is able to effectively utilize the large volume flow at very low condensation pressure in the case of a small size. The working medium flow from the evaporator, i.e., the serial arrangement from the colder part 4.1 of the exhaust gas recirculation heat exchanger 4, the exhaust gas heat exchanger 3, the internal combustion engine 1 and the warmer part 4.2 of the exhaust gas recirculation heat exchanger 4, has a high temperature and a high evaporation pressure when fed into the volumetric expansion engine 6. The volumetric expansion engine 6 adjusts the inlet flow volume flow and thus the inlet pressure by its speed. The downstream turbine can still make effective use of the large volume flow, which is due to the low condensation pressure, in the case of an acceptable size. The working medium flow exiting from the expansion engine 6, which is designed as a turbine, for example, to the condenser 8 has a low temperature and a very low condensation pressure.

The pressure control can be based on the following criteria: in evaporative cooling, the evaporation pressure determines the wall temperature of the cooled parts. A high wall temperature results in a lower heat transfer during combustion and thus in a hotter and possibly faster combustion, which tends to produce more nitrogen oxide ($NO_x$). In $NO_x$-critical engine operation (e.g., in the city or with cold exhaust aftertreatment), a low evaporation pressure can be used in a targeted manner to reduce nitrogen oxide emissions.

In normal operation, the evaporation pressure should be set such that the wall temperatures reach values that are approximately those achievable with a conventional cooling system. Higher wall temperatures can also be operated safely because the temperature can be set much more precisely than is possible with cooling water. Therefore, less safety distance must be kept to critical values. Hotter wall temperatures lead to lower fuel consumption and higher $NO_x$ emissions. A compromise between these two emissions can be better adjusted by the additional degree of freedom of the evaporation pressure.

When the safe operation of the components to be cooled and the compliance with the pollutant emissions is ensured, the evaporating pressure can be adjusted in such a way that the capacity of the expansion engine 6 (or expansion engines) minus the capacity of pump 7 is optimal.

The temperature control is intended to ensure that the highest temperature in the system does not exceed the decomposition temperature of the working medium used or of a construction material used, for example, for seals. Furthermore, the inlet temperature of the working medium into the expansion engine 6 should meet the requirements of the expansion engine 6. If a turbine is used, the outlet steam should not become too wet so that the turbine is not endangered by dripping.

The following sensors can be provided: a pressure sensor at the inlet of the expansion engine 6, a temperature sensor at the inlet of the expansion engine 6, a pressure sensor and a temperature sensor at the inlet of the pump 7, a pressure sensor at the outlet of the pump 7.

In addition, a mass flow sensor can be provided after the pump 7, in particular if the pump 7 is not easily describable via a model. Further temperature sensors can be provided before and/or after the individual parts of the evaporator, i.e., the colder part 4.1 of the exhaust gas recirculation heat exchanger 4, the exhaust gas heat exchanger 3, the internal combustion engine 1 and the warmer part 4.2 of the exhaust gas recirculation heat exchanger 4.

Figure 2:
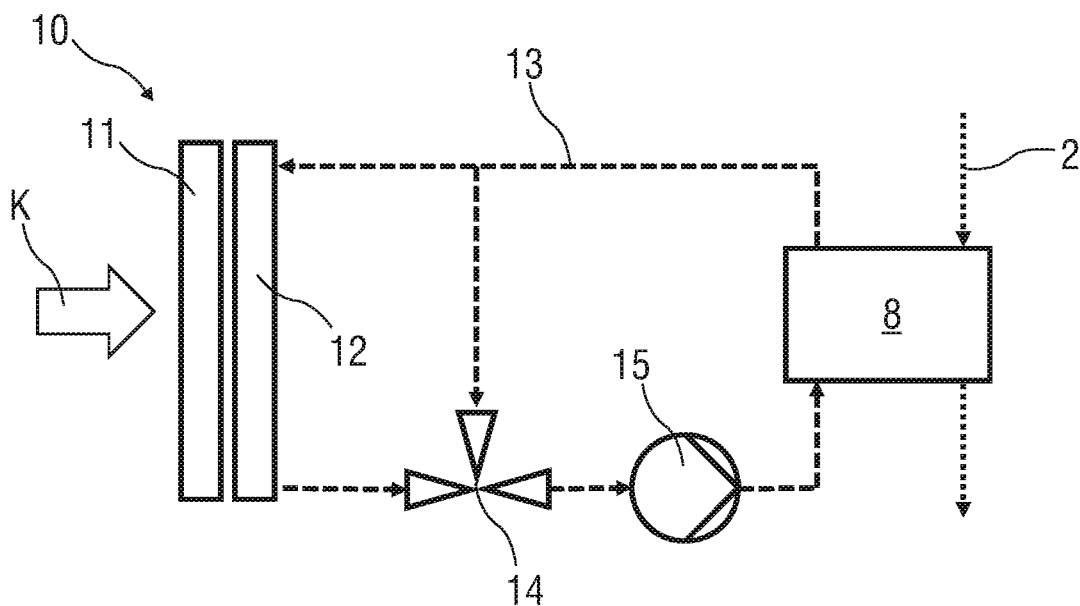
FIG. 2 is a schematic depiction of an additional cooling system.

FIG. 2 shows a schematic diagram of an additional cooling system 10. In a cooling air flow K, first, for example at the front of a vehicle, there is an intercooler 11. The intercooling can be direct or indirect; in indirect systems, several stages are also possible. Other components requiring cooling at a low temperature level can also be integrated. An air-conditioning condenser (not depicted) can also be provided.

Downstream of the intercooler 11 in the cooling air flow K, a re-cooler 12 is provided for the evaporation cooling. This should also be supplied with air which is as cool as possible. However, the intercooling or low-temperature cooling has priority. The heat exchanger 12 is located in a cooling water circuit 13. The temperature of the cooling water circuit 13 is limited downwards by means of a 3/2 way valve 14 to prevent too low condensation temperatures or, if water is used as the working medium, freezing. A cooling water pump 15 is preferably controllable (mechanically or electrically) and sets the mass flow in the cooling water circuit 13 so low that subcooling of the pump 7 in the working circuit 2 is ensured. Optionally, the controllable cooling water pump 15 sets the mass flow in the cooling water circuit 13 so high that the performance balance of the system (performance of the expansion engine 6—performance of the pump 7—performance of the cooling water pump 15) is as optimal as possible. After the cooling water pump 15, the cooling water flows through the condenser 8 of the working circuit 2, which is designed as a condensation heat exchanger.

The described process control of an exhaust heat recovery system combines the approach of an increased temperature in the cylinder head with a serially connected exhaust heat recovery system.

Due to the constantly high heat supply temperature in the cylinder head—a heat source such as exhaust gas, for example, cools down when heat is extracted from it, but the cylinder head does not due to the simultaneous heat supply from combustion and friction—the efficient use of the working medium water (or water/ethanol mixture) is possible. This allows the efficiency of the waste heat recovery system to be almost doubled; at the same time, the heat input into the system is significantly increased by the additional heat input from the engine cooling system.

The system performance of the arrangement can be considerably increased. Further advantages can be achieved for the combustion, the exhaust gas aftertreatment and the supercharging. The combustion suffers less heat loss due to the more uniform wall temperatures, while the supercharging and the exhaust gas aftertreatment benefit from higher exhaust temperatures. Thus, the possibly higher $NO_x$ level can be more than compensated by the more homogenous wall temperature.

Figure 3:
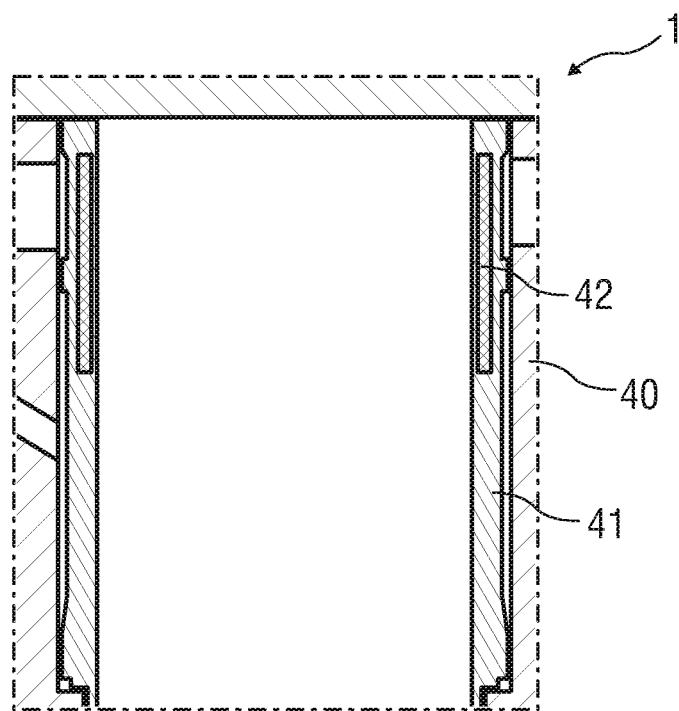
FIG. 3 is a schematic detailed view of the internal combustion engine having a cylinder, which is provided with a cylinder liner, into which the cooling ducts are inserted.

FIG. 3 is a schematic detailed view of the internal combustion engine 1 having a cylinder 40, which is equipped with a cylinder liner 41 (also called liner). Cooling ducts 42 are inserted into the cylinder liner 41. The cylinder liner 41 can be produced in the centrifugal casting process by means of a centrifugal mold. The cooling ducts 42 can be inserted into the centrifugal mold as inserts, for example in the form of hollow rings, before the cylinder liner 41 is cast. Alternatively, other suitable manufacturing process can be used, such as sintering or 3D-printing, for example.

The working medium flows through the cooling ducts 42.

In the upper region of the cylinder liner 41, high evaporation temperatures can be achieved in the cooling ducts 42 without changing the wall heat on the inside of the cylinder liner 41 where combustion takes place. This cooling means that a water jacket on the outside of the cylinder liner 41 can be eliminated, which also eliminates or reduces the risk of cavitation of the cylinder liner 41. Therefore, a larger piston clearance can be operated, which reduces the friction of the piston group.

In the embodiment shown in FIG. 3, the cooling duct 42 is formed as a single circumferential cavity in the cylinder liner 41, which extends over the entire region of the combustion chamber.

Figure 4:
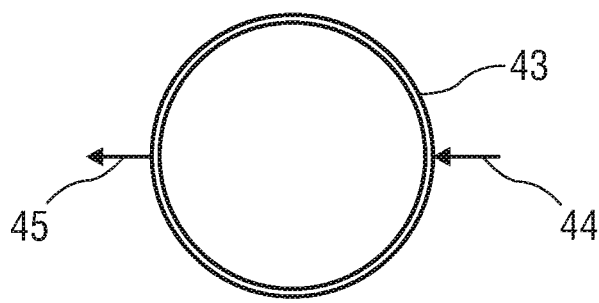
FIG. 4 is a schematic depiction of a ring for the formation of a cooling duct.
Figure 5:
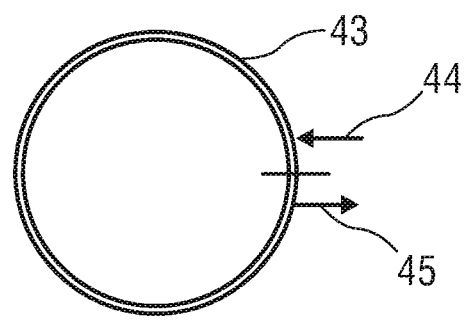
FIG. 5 is a schematic depiction of a ring for the formation of a cooling duct.

The cooling ducts 42 can be represented in two ways in the cylinder liner 41 produced by centrifugal casting: cylindrical rings 43 with internal channel geometry are inserted horizontally; these rings 43 are then cast in. Supply and discharge of the working medium, e.g., in the form of wet steam, can take place via two horizontal bores 44, 45. FIGS. 4 and 5 show schematic exemplary embodiments of rings 43 in the plan view.

In the embodiment shown in FIG. 4, the bores 44, 45 are provided on opposite sides of the ring 43. The two ring segments formed in this way are preferably of equal length, so that a parallel flow is possible.

In the embodiment shown in FIG. 5, the ring 43 is closed at one point with a stop before casting. This allows two bores 44, 45 to be used close together as an inlet and outlet. These methods can be extended to several segments.

In a further, not depicted embodiment, at least one spiral is cast in instead of one or more rings 43 as an insert. This allows the number of inlet and outlet bores to be reduced.

A serial connection of the evaporation in the cylinder liner 41 with the evaporation in a combustion chamber ceiling (and, if necessary, at an exhaust duct) is possible, in particular if evaporation at the same pressure level is possible. Otherwise, for example in a two-stage Rankine system, evaporation in the cylinder liner 41 can take place at a lower pressure level than in the head.

Figure 6:
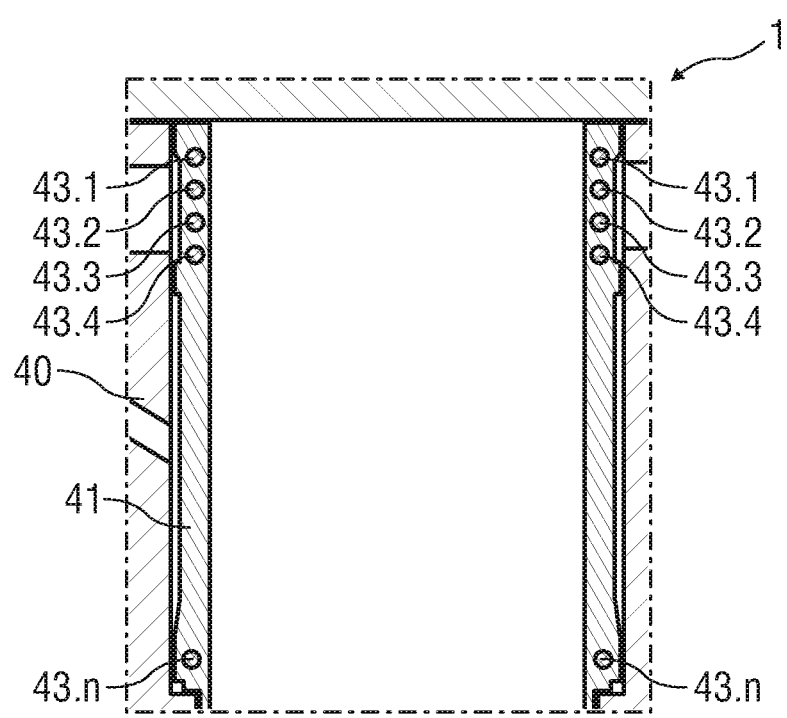
FIG. 6 is a schematic detailed view of the internal combustion engine having the cylinder, which is provided with a cylinder liner, in which several toroidal rings are arranged.

FIG. 6 is a schematic detailed view of the internal combustion engine 1 having the cylinder 40, which is provided with a cylinder liner 41 in which several toroidal rings 43.1 to 43.$n$ are arranged.

The local temperature of the cylinder liner 41 has direct effects on the local piston clearance, which in turn has strong effects on the friction and the noise behavior of the internal combustion engine 1. Since the temperature distribution changes depending on the operating point, the exact shaping of the piston and honing of the cylinder liner 41 can be a compromise between different requirements.

By using the rings 43.1 to 43.$n$, it is possible to generate different cooling temperatures quickly and precisely by adjusting the evaporation pressure level and thus the evaporation temperature. Several rings 43.1 to 43.$n$ can be combined at the same pressure level to simplify the system.

The local temperature has a direct effect on the local piston clearance. Variations in production, different operating points of the combustion engine 1 and wear during operation can be compensated in such a way that optimum operation of the piston group is possible in each case.

The pressure control can be designed with a controlled inlet and/or outlet throttle on each of the rings 43.1 to 43.$n$, such that the system pressure of a Rankine cycle waste heat recovery system can be used. The energy in the steam can be utilized in the expansion engine 6.

REFERENCE NUMERAL LIST 1 internal combustion engine
2 working circuit
3 exhaust gas heat exchanger
4 exhaust gas recirculation heat exchanger
4.1 colder part
4.2 warmer part
6 expansion engine
7 pump
8 condenser
10 cooling system
11 intercooler
12 re-cooler
13 cooling water circuit
14 3/2 way valve
15 cooling water pump
40 cylinder 41 cylinder liner
42 cooling duct
43 ring
43.1 bis 43.n ring
44, 45 bores
A exhaust gases
F fresh air
K cooling air flow
S flow direction
V combustion air

The invention claimed is:

1. An arrangement for converting thermal energy from lost heat of an internal combustion engine into mechanical energy, comprising:
   a working circuit for a working medium which is heatable and evaporatable using the lost heat;
   an expansion engine disposed in the working circuit, wherein mechanical energy from heat of the working medium is obtainable by the expansion engine; and
   a heat exchanger mounted upstream of the expansion engine in a flow direction of the working medium, wherein the working circuit extends through the heat exchanger;
   wherein the heat exchanger comprises an exhaust gas recirculation heat exchanger having a cold part and a warm part, an exhaust gas heat exchanger, and a phase transition cooling in the internal combustion engine;
   wherein the internal combustion engine comprises a cylinder having a cylinder liner;
   wherein the heat exchanger is formed by serial connection in a sequence of the cold part of the exhaust gas recirculation heat exchanger, the exhaust gas heat exchanger, the phase transition cooling in the internal combustion engine, and the warm part of the exhaust gas recirculation heat exchanger;
   wherein a cooling duct is provided in the cylinder liner through which the working medium is flowable;
   wherein the cylinder liner is formed by centrifugal casting using a centrifugal mold and wherein the cooling duct is introduced into the centrifugal mold as an insert prior to the centrifugal casting.

2. The arrangement according to claim 1, wherein the insert is a cylindrical or toroidal ring.

3. The arrangement according to claim 2, wherein the cylinder liner has at least two bores that connect with the cylindrical or toroidal ring.

4. The arrangement according to claim 3, wherein the at least two bores are disposed on opposite sides of the cylindrical or toroidal ring.

5. The arrangement according to claim 4, wherein the cylindrical or toroidal ring is closed at a point in a circumferential direction with a stop and wherein the at least two bores are disposed adjacent to each other on either side of the stop.

6. The arrangement according to claim 1, wherein the insert is spiral.

7. The arrangement according to claim 2 further comprising a plurality of inserts in the cylinder liner and wherein the plurality of inserts are toroidal rings.

8. The arrangement according to claim 7, wherein the plurality of inserts are each provided with an inlet and/or an outlet throttle via which evaporation in the respective insert is adaptable such that a thermal expansion of the cylinder liner is adjustable.

9. A method for making an arrangement for converting thermal energy from lost heat of an internal combustion engine into mechanical energy, wherein the arrangement comprises:
   a working circuit for a working medium which is heatable and evaporatable using the lost heat;
   an expansion engine disposed in the working circuit, wherein mechanical energy from heat of the working medium is obtainable by the expansion engine;
   a heat exchanger mounted upstream of the expansion engine in a flow direction of the working medium, wherein the working circuit extends through the heat exchanger;
   wherein the heat exchanger comprises an exhaust gas recirculation heat exchanger having a cold part and a warm part, an exhaust gas heat exchanger, and a phase transition cooling in the internal combustion engine;
   wherein the internal combustion engine comprises a cylinder having a cylinder liner;
   wherein the heat exchanger is formed by serial connection in a sequence of the cold part of the exhaust gas recirculation heat exchanger, the exhaust gas heat exchanger, the phase transition cooling in the internal combustion engine, and the warm part of the exhaust gas recirculation heat exchanger;
   wherein a cooling duct is provided in the cylinder liner through which the working medium flows;
   and comprising the steps of:
   forming the cylinder liner by centrifugal casting using a centrifugal mold; and
   introducing the cooling duct into the centrifugal mold as an insert prior to the centrifugal casting.

* * * * *